United States Patent [19]

Day

[11] Patent Number: 4,826,651

[45] Date of Patent: May 2, 1989

[54] METHOD AND APPARATUS FOR ASSISTING THE PROCESS OF LOADING A REACTOR CORE WITH ELONGATED FUEL ELEMENTS

[75] Inventor: Bobby L. Day, Rancho Muieta, Calif.

[73] Assignee: Brown, Boveri Reaktor, GmbH, Mannheim, Fed. Rep. of Germany

[21] Appl. No.: 21,474

[22] Filed: Mar. 4, 1987

[30] Foreign Application Priority Data

Mar. 4, 1986 [DE] Fed. Rep. of Germany ....... 3606997

[51] Int. Cl.$^4$ .............................................. G21C 19/00
[52] U.S. Cl. ...................................... 376/264; 33/502; 358/100; 376/248; 376/258; 376/270
[58] Field of Search .......................... 33/502; 358/100; 376/248, 258, 264, 270

[56] References Cited

U.S. PATENT DOCUMENTS

| | | | |
|---|---|---|---|
| 3,783,189 | 1/1974 | Nelson | 358/100 |
| 4,427,623 | 1/1984 | Howard et al. | 376/258 |
| 4,668,981 | 5/1987 | Egger | 376/248 |
| 4,713,212 | 12/1987 | Plumier | 376/264 |

FOREIGN PATENT DOCUMENTS

| | | |
|---|---|---|
| 1138170 | 10/1962 | Fed. Rep. of Germany . |
| 2513655 | 10/1976 | Fed. Rep. of Germany . |
| 2707400 | 11/1977 | Fed. Rep. of Germany . |
| 674268 | 12/1965 | France . |
| 1074282 | 7/1967 | United Kingdom . |

Primary Examiner—Charles T. Jordan
Assistant Examiner—Richard W. Wendtland
Attorney, Agent, or Firm—Herbert L. Lerner; Laurence A. Greenberg

[57] ABSTRACT

Method and apparatus for assisting the loading of a reactor core with new and/or irradiated elongated fuel assemblies which includes inserting a fuel assembly with a fuel assembly carrier from a storage pit into a grid position of a reactor core with a refueling machine having propelling equipment, supplying an actual position of the fuel assembly carrier to the propelling equipment of the refueling machine during movement of the refueling machine between the storage pit and the reactor vessel, comparing the actual position of the fuel assembly carrier with a desired position of the fuel assembly carrier to find a deviation, and carrying out a correction of the deviation in the travelling movement of the refueling machine based upon the comparison.

5 Claims, 3 Drawing Sheets

METHOD AND APPARATUS FOR ASSISTING THE PROCESS OF LOADING A REACTOR CORE WITH ELONGATED FUEL ELEMENTS

The invention relates to a method for assisting the process of loading a reactor core with new and/or irradiated elongated fuel assemblies, in which a fuel assembly from a storage pit is inserted into the grid position of a reactor core using a refueling machine preferably under a neutron-shielding liquid covering.

A method of this kind is known from German Published, Prosecuted Application No. DE-AS 22 46 637. In that publication a container having a plurality of fuel assemblies is supposed to be inserted into the reactor core all at once, in order to speed up the loading process when fuel assemblies are changed.

It is also known from German Published, Non-Prosecuted Application No. DE-OS 15 64 301 that when binoculars are used for observation and with a covering of water several meters thick, it is impossible to insert the wavering fuel assemblies into the grid positions of the core without expending a great deal of time. During that time, the fuel assemblies are prevented from wobbling by other means. However, one problem in this respect is that the axis of the carrier or base of the fuel assembly dos not coincide with the desired location of the axis. It is true that the deviations that arise due to bowing, are only on the order of only a few millimeters; nevertheless, they make it considerably more difficult to introduce the fuel assembly carrier into a particular grid position in the reactor core. Furthermore, the mechanical insertion aid proposed in German Published, Non-Prosecuted Application No. DE-OS 15 64 301 cannot be used unless enough space is available between the various grid positions for the insertion of cross-shaped control elements.

It is accordingly an object of the invention to provide a method and apparatus for assisting the process of loading a reactor core with elongated fuel assemblies, which overcomes the hereinafore-mentioned disadvantages of the heretoforeknown methods and devices of this general type and with which it becomes possible to insert fuel assemblies in which the axis of the carrier or base deviates from its desired axis.

With the foregoing and other objects in view there is provided, in accordance with the invention, a method for assisting the loading of a reactor core with new and/or irradiated elongated fuel assemblies, which comprises inserting a fuel assembly with a fuel assembly carrier from a storage pit into a grid position of a reactor core with a refueling machine having propelling equipment preferably under a neutron-shielding liquid covering, supplying an actual position of the fuel assembly carrier to the propelling equipment of the refueling machine during movement of the refueling machine between the storage pit and the reactor vessel, comparing the actual position of the fuel assembly carrier with a desired position of the fuel assembly carrier to find a deviation, and carrying out a correction of the deviation in the travelling movement of the refueling machine based upon the comparison.

Bowing of the fuel assembly, which is entirely to be expected because of its length of over four meters, can accordingly no longer hinder the insertion of the fuel assemblies into the grids of the core supporting structure disposed in the reactor core. If the ascertained actual position of the carrier or base deviates from its desired position, the travel movement of the refueling machine is corrected by the amount of the deviation.

In accordance with another mode of the invention, there is provided a method which comprises transmitting a picture from a stationary television camera to a monitor, for recognizing the deviation from the desired position and ascertaining the actual position of the fuel assembly carrier.

With the objects of the invention in view there is also provided an apparatus for assisting the loading of new and/or irradiated elongated fuel assemblies having fuel assembly carriers into grid positions of a reactor core in a reactor vessel of a reactor having a storage pit, a flooding pit and a lead through therebetween, comprising a refueling machine having propelling equipment for transferring a fuel assembly from the storage pit to the flooding pit and inserting the fuel assembly into a grid position, means for recognizing the actual position of the fuel assembly carrier at a measuring point in the vicinity of the lead through and for supplying the actual position of the fuel assembly carrier to the propelling equipment of the refueling machine during movement of the refueling machine between the storage pit and the reactor vessel, means for comparing the actual position of the fuel assembly carrier with a desired position of the fuel assembly carrier to find a deviation, and means for carrying out a correction of the deviation in the travelling movement of the refueling machine based upon the comparison.

The refueling machine moves to a predetermined position relative to the location of the television camera, so that the actual position of the fuel assembly carrier can be ascertained exactly.

In accordance with a concomitant feature of the invention, the lead through includes guide rails for a floodgate and means supported in the guide rails for holding the recognizing means at the measuring point. Fixation of the camera is thus accomplished in a simple manner.

Other features which are considered as characteristic for the invention are set forth in the appended claims.

Although the invention is illustrated and described herein as embodied in a method and apparatus for assisting the process of loading a reactor core with elongated fuel assemblies, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

Figure 1:
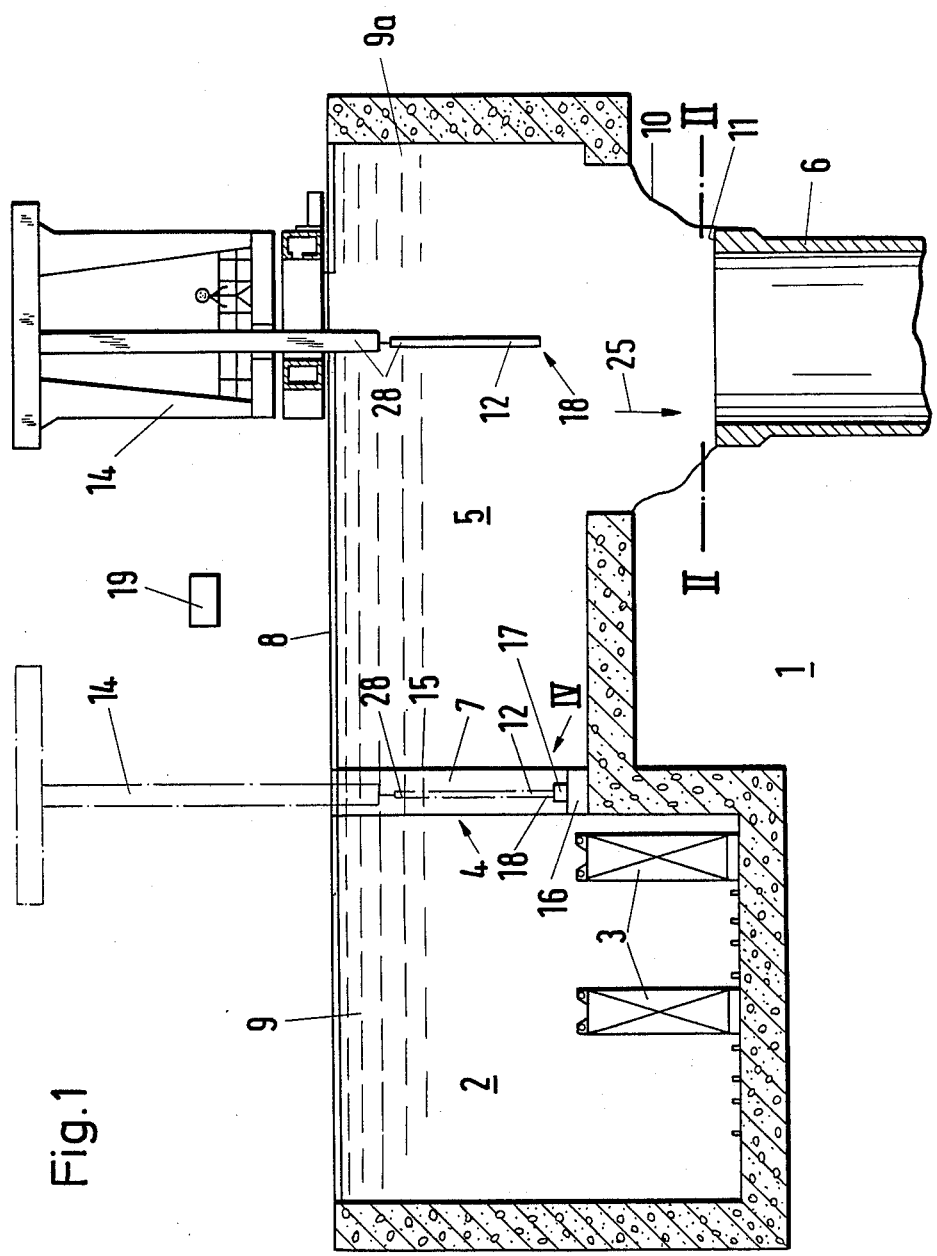
FIG. 1 is a fragmentary, diagrammatic, cross-sectional view of a storage or spent fuel pit and a flooding or reactor pit, with a reactor vessel or pressure vessel and a refueling or fuel assembly changing machine.

Referring now to the figures of the drawings in detail and first, particularly, to FIG. 1 thereof, there is seen a cross section of a portion 1 of a reactor building, the remainder of which is not shown. A storage or spent fuel pit 2 contains two storage racks 3. A partition 4 has a non-illustrated floodgate or sluice, which during operation of the reactor plant closes off a lead through, penetrator or transition 7 and separates the storage pit 2 from a flooding or reactor pit 5 located above a reactor vessel 6. FIG. 1 shows a reactor plant that has been shut down, so that the reactor vessel 6 is open. Both the storage pit 2 and the flooding pit 5 are filled with neutron-shielding liquid or water 9, 9a across the lead through 7 that is several meters thick, up to a level indicated at reference numeral 8. A compensator 10 which extends between the flooding pit 5 and a flange 11 of the opened reactor vessel 6, prevents the water from escaping downward.

Figure 2:
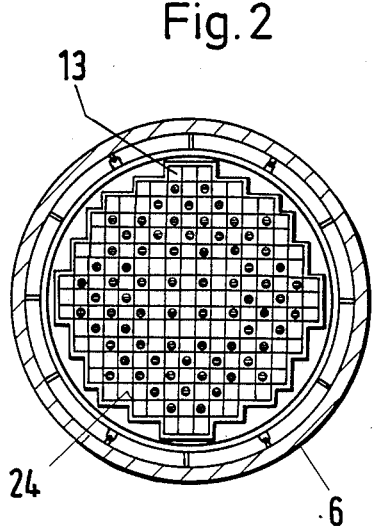
FIG. 2 is a sectional view taken along the line II—II in FIG. 1, on a larger scale.
Figure 4A:
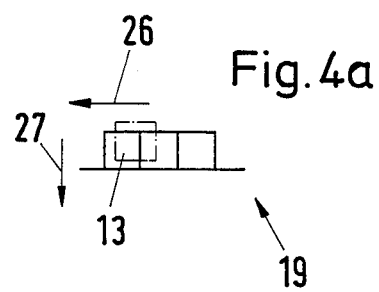
FIGS. 4 and 4a are top-plan and side-elevational views showing the deviation of the fuel assembly carrier from the grid position.
Figure 4:
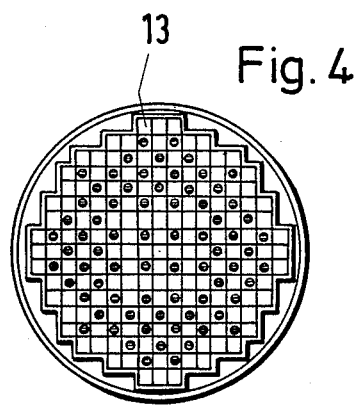
Figure 3:
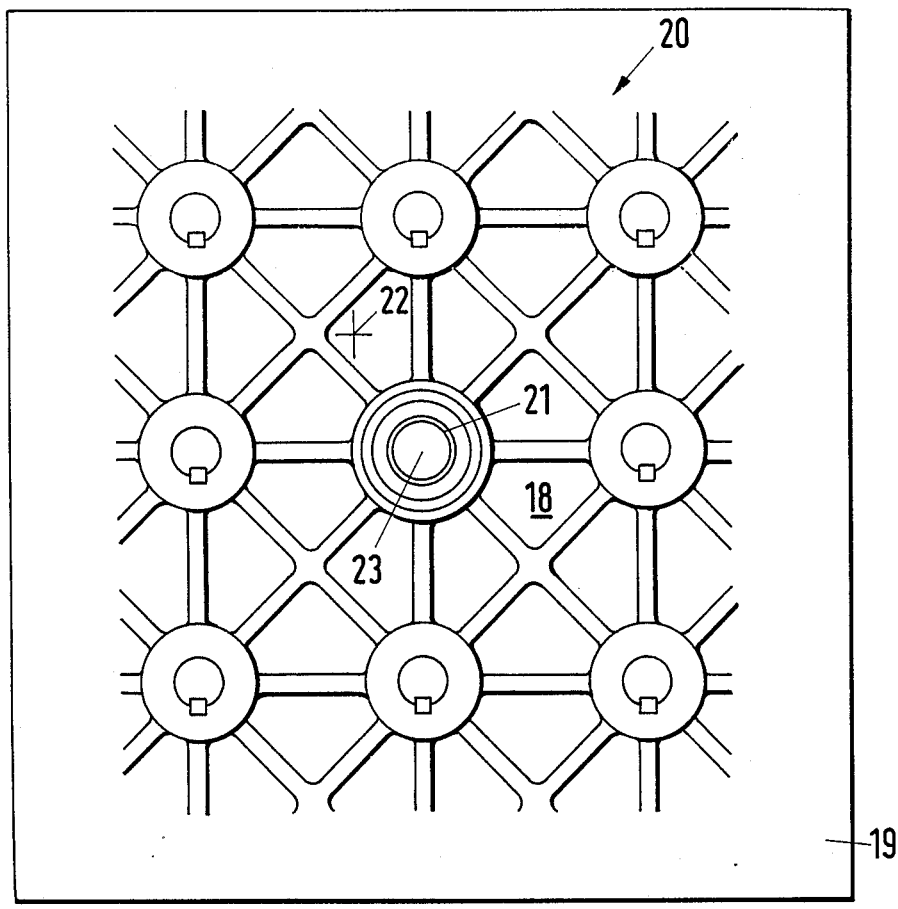
FIG. 3 is a view of a monitor showing a fragmentary, bottom-plan view of a central portion of the lower surface of a fuel assembly carrier and a nominal or reference axis of the fuel assembly carrier.

If a fuel assembly 12 from the storage rack 3 in the storage pit 2 is to be inserted into a grid position 13 of a core supporting structure 24 of the reactor vessel 6 shown in FIGS. 2 and 4, then a refueling or fuel assembly changing machine 14 takes such a fuel assembly 12 from the rack 3 and moves with the fuel assembly through the lead through 7 between the storage pit 2 and the flooding pit 5. A television camera 17 is disposed in a stationary manner on a holder 16 in guide rails 15 for the removed floodgate. As soon as the refueling machine 14 has reached the position represented in phantom, the position of a carrier element or base 18 of the fuel assembly 12 appears in a monitor 19 shown in FIG. 3. Specifically, the monitor shows what is picked up by the camera, that is a central portion 20 of the lower surface of the fuel assembly carrier 18. A central tube 21 of the fuel assembly carrier serves as a reference point. The desired position of the central tube and therefore of the fuel assembly along with a nominal or reference axis axis 22, is stored in a memory in propelling or driving equipment and also appears on the monitor. The driver of the refueling machine causes the nominal or reference axis 22 to coincide with the axis 23 of the central tube 21 and thus compensates for the deviation between the desired and actual positions of the fuel assembly carrier. The grid position 13 of the core supporting structure 24 of FIG. 4, which is shown on a larger scale in FIG. 4a, shows the actual position of the fuel assembly carrier in broken lines. A lowering of the fuel assembly in the direction of an arrow 25 before the deviation was corrected would complicate or impede the mounting of the fuel assembly 12 and would thus make insertion into the grid position more difficult. However, if a correcting movement of the refueling machine 14 is first performed in the direction of arrows 26, 27, until the reference axis 22 coincides with the axis 23 of the central tube 21 as shown in FIG. 3, then the refueling machine 14 can insert the fuel assembly 12 into the grid position 13 without danger, as shown in solid lines in FIG. 4.

Figure 5:
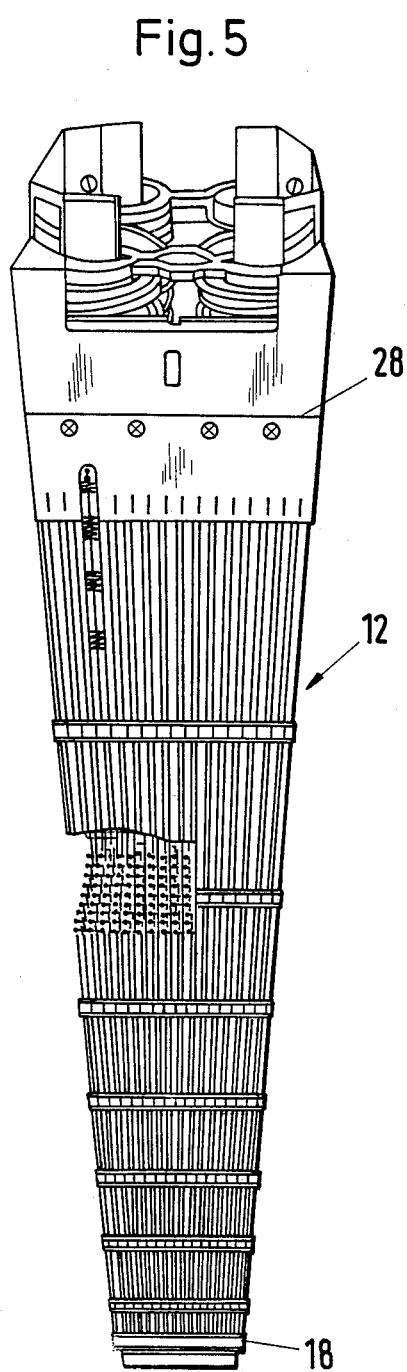
FIG. 5 is a longitudinally extended perspective view of a fuel assembly, on a larger scale.

Bowing is expressed in a misalignment between a head piece or top 28 and the carrier element 18 of the fuel assembly 12; the nominal or rated size of the travelling movement of the refueling machine is calibrated by using the position of the head piece 28 and must be corrected with respect to the position of the carrier element 18. A fuel assembly shown on a larger scale in FIG. 5, measuring approximately 4207 mm in total length and 217 mm on a side, with a total weight of approximately 683 kg, must be inserted without danger into the grid of the reactor vessel, as shown in FIG. 2.

A substantial advantage of the novel loading method is a time saving of several days in reloading the entire core, with the result that the nuclear reactor plant is more quickly available for use.

A torsion-proof test gauge, having similar contours to a fuel assembly, serves to set the camera position and the reference axis of the fuel assembly. It can be positioned either in the lead through 7 or at any point in the storage pit.

The foregoing is a description corresponding in substance to German Application No. P 36 06 997.3, dated Mar. 4, 1986, the International priority of which is being claimed for the instant application, and which is hereby made part of this application. Any material discrepancies between the foregoing specification and the aforementioned corresponding German application are to be resolved in favor of the latter.

I claim:

1. Method for assisting the loading of a reactor core with new and/or irradiated elongated fuel assemblies, which comprises inserting a fuel assembly with a fuel assembly carrier from a storage pit into a grid position of a reactor core with a refueling machine having propelling equipment, supplying an actual position of the fuel assembly carrier to the propelling equipment of the refueling machine during movement of the refueling machine between the storage pit and the reactor vessel, comparing the actual position of the fuel assembly carrier with a desired position of the fuel assembly carrier to find a deviation, and carrying out a correction of the deviation in the travelling movement of the refueling machine based upon the comparison.

2. Method according to claim 1, which comprises performing the inserting step under a neutron-shielding liquid covering.

3. Method according to claim 1, which comprises transmitting a picture from a stationary television camera to a monitor, for recognizing the deviation from the desired position and ascertaining the actual position of the fuel assembly carrier.

4. Apparatus for assisting the loading of new and/or irradiated elongated fuel assemblies having fuel assembly carriers into grid positions of a reactor core in a reactor vessel of a reactor having a storage pit, a flooding pit and a lead through therebetween, comprising a refueling machine having propelling equipment for transferring a fuel assembly from the storage pit to the flooding pit and inserting the fuel assembly into a grid position, means for recognizing the actual position of the fuel assembly carrier at a measuring point in the vicinity of the lead through and for supplying the actual position of the fuel assembly carrier to said propelling equipment of said refueling machine during movement of said refueling machine between the storage pit and the reactor vessel, means for comparing the actual position of the fuel assembly carrier with a desired position of the fuel assembly carrier to find a deviation, and means for carrying out a correction of the deviation in the travelling movement of said refueling machine based upon the comparison.

5. Apparatus according to claim 3, wherein said lead through includes guide rails for a floodgate and means supported in said guide rails for holding said recognizing means at said measuring point.

* * * * *